United States Patent
Anderson et al.

(10) Patent No.: US 8,860,611 B1
(45) Date of Patent: Oct. 14, 2014

(54) RFID-BASED MOBILE VEHICLE LOCALIZATION

(75) Inventors: Roger J. Anderson, Panama City, FL (US); Jeremy E Hatcher, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 343 days.

(21) Appl. No.: 13/472,048

(22) Filed: May 15, 2012

(51) Int. Cl.
*G01S 3/02* (2006.01)
(52) U.S. Cl.
USPC ............................................................ 342/457
(58) Field of Classification Search
USPC ............................................................ 342/457
See application file for complete search history.

(56) References Cited

U.S. PATENT DOCUMENTS

| | | | | |
|---|---|---|---|---|
| 2005/0200456 | A1* | 9/2005 | Bridgelall | 340/10.1 |
| 2007/0099623 | A1* | 5/2007 | Stephensen et al. | 455/446 |

* cited by examiner

*Primary Examiner* — Harry Liu
(74) *Attorney, Agent, or Firm* — James T. Shepherd

(57) ABSTRACT

An RFID localization system includes RFID tags positioned at known locations in a local frame of reference. Each RFID tag generates an RF signal indicative of its unique identity. RF antennas are mounted on a mobile vehicle at known positions/orientations relative to a reference point thereon. Each antenna has a range-bounded field-of-view associated therewith and detects each RF signal generated by any of the RFID tags within its range-bounded field-of-view. A processor coupled to the antennas stores information to include (i) each of the known locations of the RFID tags along with their unique identification, (ii) each known position and orientation of the antennas, and (iii) each range-bounded field-of-view associated with each antenna. The processor implements an evolutionary optimization scheme using the stored information based on each RF signal so-detected in order to determine a position and orientation of the mobile vehicle in the local frame of reference.

11 Claims, 2 Drawing Sheets

RFID-BASED MOBILE VEHICLE LOCALIZATION

STATEMENT OF GOVERNMENT INTEREST

The invention described herein may be manufactured and used by or for the Government of the United States of America for Governmental purposes without payment of any royalties thereon or therefor.

FIELD OF THE INVENTION

The invention relates generally to localization systems, and more particularly to an RFID-based localization system for mobile vehicles or robots.

BACKGROUND OF THE INVENTION

Commonly used localization approaches developed for mobile vehicle or robot navigation include dead reckoning, GPS, vision systems (both onboard and off-board), baseline navigation, inertial navigation, sonar, and laser point clouds. The principal disadvantages of dead reckoning methods are that navigation errors grow without bound and systems cannot accommodate effector slip. Absolute localization methods, such as those that use GPS, bound error but can often fail in indoor environments due to signal loss. Vision systems, sonar, and laser point clouds use relative information from the environment, but require training to interpret sensor data for use in deliberative robot architectures. Inertial navigation systems rely on integrating accelerations and, like dead reckoning, suffer from unbounded error. Baseline navigation is similar to GPS navigation in that absolute position information is derived from beacons with known absolute position. Although beacons can be placed in areas that would otherwise be GPS-denied, at least two beacons must always remain in line-of-sight to eliminate disambiguates and sensors must be capable of measuring range or bearing to beacons.

Another type of localization utilizes "radio frequency identification" (RFID) tags. RFID localization systems typically employ Received Signal Strength Indication (RSSI) or proximity methods in Cartesian or polar fields. RFID localization approaches based on RSSI use an approximation of time-of-flight of RF signals to deduce range information to fixed RFID tags. This trilateration approach is similar in concept to GPS and baseline navigation. Thus, errors result because the distance-RSSI relationship is extremely non-linear, and the only practical way to use RSSI is through careful calibration of a known environment. However, even with careful calibration, changes within the environment can have a significant impact on RSSI signals (e.g., opening or closing a door or even movements of the robot within the environment) that require a recalibration. RFID localization based on proximity localization utilizes a set of RFID tags with known locations on a floor. Location is determined under the assumption that visible tags are within a given radius of the antenna. In addition, since tags are located on the floor, tags are exposed to damage from robot movement or by other equipment/personnel sharing the space.

SUMMARY OF THE INVENTION

Accordingly, it is an object of the present invention to provide a localization system for a mobile vehicle.

Another object of the present invention is to provide a localization system for mobile vehicles that function in indoor environments.

Still another object of the present invention is to provide a localization system for mobile vehicles using existing sensing technology.

Other objects and advantages of the present invention will become more obvious hereinafter in the specification and drawings.

In accordance with the present invention, a radio frequency identification (RFID) localization system includes a plurality of RFID tags positioned at known locations in a local frame of reference. Each of the RFID tags has a unique identification associated therewith. Each of the RFID tags generates an RF signal indicative of the unique identification associated therewith. At least two RF antennas are mounted on a mobile vehicle. Each of the RF antennas is at a unique known position and orientation relative to a reference point on the mobile vehicle. Each of the RF antennas has a range-bounded field-of-view associated therewith. Each of the RF antennas detects each RF signal generated by any of the RFID tags within the antenna's range-bounded field-of-view. A processor coupled to the RF antennas stores information to include (i) each of the known locations of the RFID tags along with the unique identification associated therewith, (ii) each known position and orientation of the RF antennas, and (iii) each range-bounded field-of-view associated with each RF antenna. The processor implements an evolutionary optimization scheme using the stored information based on each RF signal so-detected in order to determine a position and orientation of the mobile vehicle in the local frame of reference.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
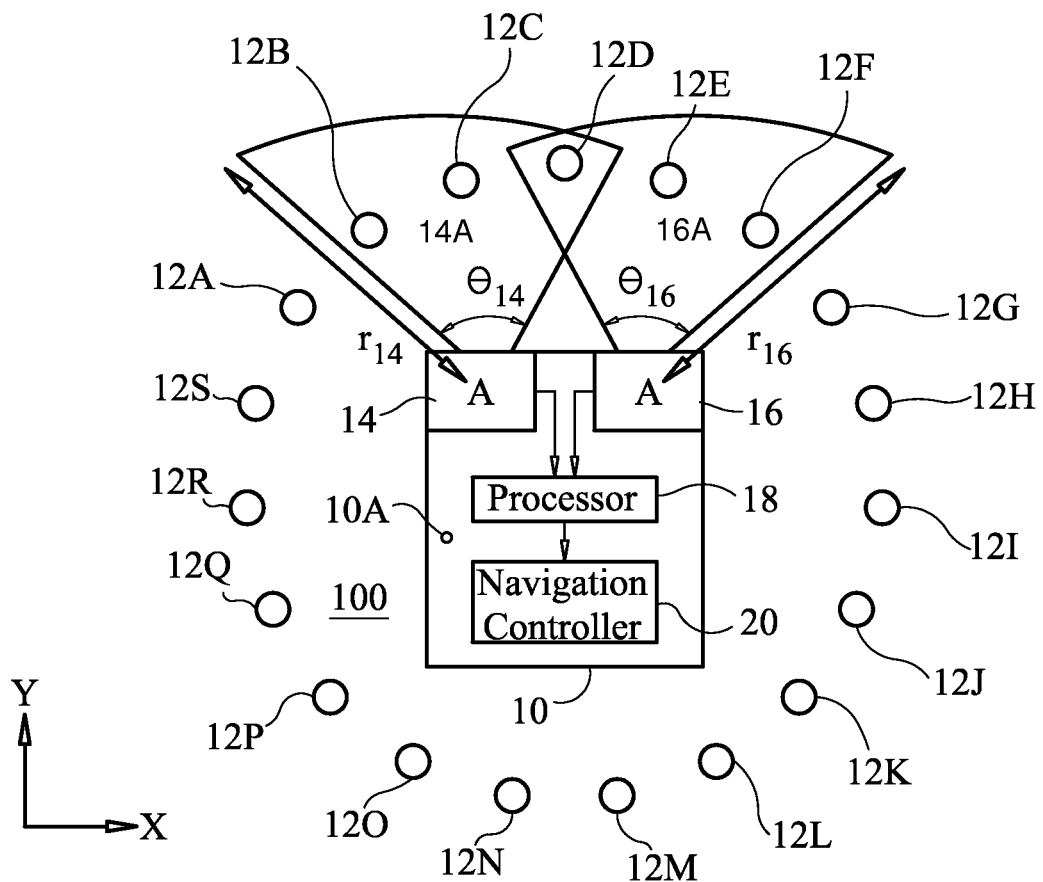
FIG. 1 is a plan view of an operational environment having a number of RFID tags dispersed therein and having a mobile vehicle equipped with the means to read the RFID tags and process their information in order to provide localization information about the mobile vehicle in accordance with the present invention.

Referring now to the drawings and more particularly to FIG. 1, a mobile vehicle or robot 10 is positioned in an operational environment 100 (e.g., a floor, the ground, etc.) having a number of "radio frequency identification" (RFID) tags 12A-12S dispersed therearound. The number of tags used, their placement (e.g., on the floor, walls, stationary objects in environment 100, etc.), separation between tags, and geometric arrangement of the tags, are not limitations of the present invention.

Generally, the RFID tags will be positioned about the perimeter of the operational environment that can be an indoor/enclosed environment or outdoor/open environment. The RFID tags can be active (i.e., always transmitting) or passive (i.e., transmit only when interrogated) without departing from the scope of the present invention. However, in all cases when an RFID tag is transmitting, an RF signal is output therefrom where such RF signal includes information that uniquely identifies the RFID tag. In addition, each RFID tag 12A-12S is positioned at a known location identifiable in a local frame of reference or coordinate system, e.g., an X-Y coordinate system as shown.

Mobile vehicle or robot 10 (hereinafter referred to simply as "robot 10") can be any vehicle that needs to know its position and orientation in operational environment 100. Generally, robot 10 will be an unmanned autonomous robot designed to carry out one or more tasks in operational environment 100. The particular type of tasks and overall construction details of robot 10 are not limitations of the present invention. For purpose of the present invention, robot 10 is equipped with means/systems that will move it in operational environment 100 predicated on its position and orientation information generated by the present invention.

Mounted on robot 10 is a plurality of RF antennas (designated by "A" in FIG. 1) where the minimum of two RF antennas 14 and 16 are illustrated for purpose of describing the present invention. Additional RF antennas can be provided without departing from the scope of the present invention. For example, an additional pair of RF antennas (not shown) could be provided on the side of robot 10 that opposes the side supporting antennas 14 and 16. Each provided RF antenna is located on robot 10 at a known position and orientation with respect to some point of reference on robot 10, e.g., a reference point 10A on robot 10. In addition, each provided RF antenna has a range-bounded field-of-view associated therewith. That is, each RF antenna can "see" any of RFID tags 12A-12S that are transmitting and that lie within the particular RF antenna's angular field-of-view and range of sensitivity. In FIG. 1, the angular field-of-view of RF antennas 14 and 16 is referenced by $\theta_{14}$ and $\theta_{16}$, respectively, and their range of sensitivity is referenced by $r_{14}$ and $r_{16}$, respectively. Thus, the range-bounded field-of-view of RF antennas 14 and 16 are indicated by the pie-shaped wedges 14A and 16A, respectively. The range-bounded field-of-views can overlap (as illustrated in FIG. 1), but this is not a requirement of the present invention.

Figure 2:
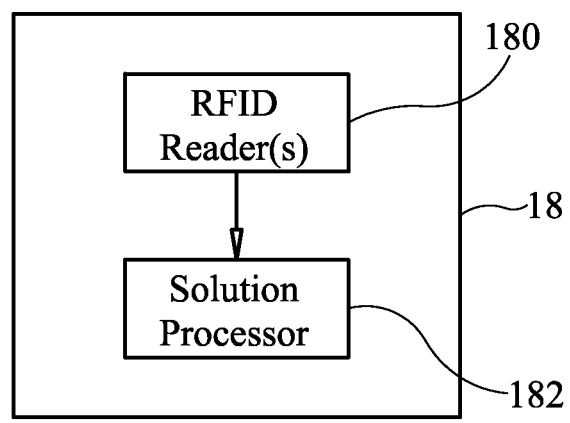
FIG. 2 is an isolated schematic view of a processor using an RFID reader and solution processor in accordance with an embodiment of the present invention.

RF antennas 14 and 16 can be coupled to an onboard processor 18 (as shown) or coupled (e.g., via telemetry) to a remotely-located processor. In either case, processor 18 controls the reading or scanning of the antennas to collect the identifying information from the RF signal associated with each RFID tag detected, and then processes the information in accordance with the present invention to provide the robot's position and orientation in the X-Y coordinate system to an onboard navigation controller 20. It is to be understood that the implementation and operation of controller 20 are not part of, or a limitation of, the present invention. For example, controller 20 could implement a pre-planned route or an adaptive route planning scheme based on the position and orientation information generated by processor 18. It is further to be understood that the reading/scanning and information processing operations can be provided by a single hardware system or multiple hardware systems without departing from the scope of the present invention. For example, FIG. 2 illustrates a processor 18 that utilizes one or more conventional RFID reader(s) 180 for reading/scanning RF antennas 14 and 16, and then a separate solution processor 182 for generating the position and orientation solution using the scanned antenna information.

In general, processor 18 (e.g., solution processor 182) uses the simple detection of ones of RFID tags 12A-12S residing within each antenna's range-bounded field-of-view along with known information about RFID tag position and RF antennas 14/16, to generate position and orientation of robot 10. Thus, processor 18 includes (or has access to) database storage that stores the following:

the known location (e.g., in the X-Y coordinate system) of each RFID tag 12A-12S, the known position/orientation of RF antennas 14/16 on robot 10, and the information detailing the range-bounded field-of-view 14A/16A of RF antennas 14/16.

Processor 18 determines an instantaneous position within operational area 100 by first establishing the set of RFID tags visible to each RF antenna. Visible tag identities along with the visible tags' corresponding positional information in the tag database serve as inputs to an optimization algorithm. The optimization algorithm estimates position and orientation by evolving the theoretical position and orientation that would result from a set of visible tags that best matches the actual set of visible tags. The best match is measured through solution fitness that, in general, is a function of the number of tags that correctly match the actual tags visible. In practice, it may be necessary to weight the solution to account for the number of tags missed and/or the number of tags incorrectly identified. These sets of visible tags for a candidate solution are determined based on the range-bounded field-of-view of each antenna.

The optimization algorithm can be any suitable evolutionary optimization scheme such as a genetic algorithm or a fast hueristic optimization algorithm. By way of an illustrative example, a localization processing solution using a genetic algorithm will be described herein. The general approach of such genetic algorithms is well understood in the art. See, for example, "Introduction to Genetic Algorithms," Melanie Mitchell, MIT Press, 1998.

Figure 3:
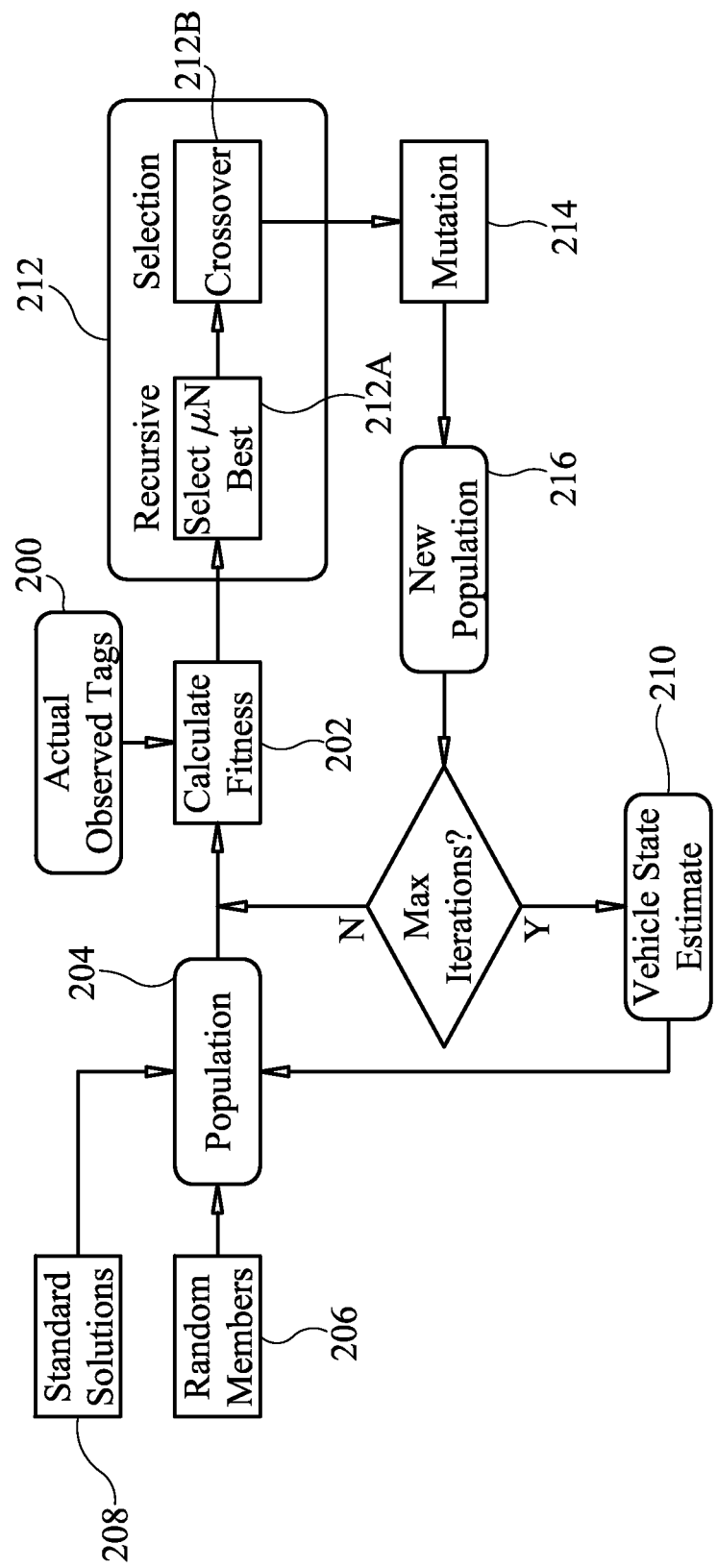
FIG. 3 is a process diagram of a genetic algorithm used by the solution processor in accordance with an embodiment of the present invention.

Referring now to FIG. 3, a genetic algorithm localization process begins by having each antenna perform a read of tags "visible" thereto in environment 100 as indicated at 200. The set of observed tags 200 can be filtered by discarding those tags not present in the processor's database. In order to localize, a complete set of tags observable by each antenna is required. Thus, the same tag may be included in the complete set of observed tags multiple times. Although RFID readers are capable of indicating all antennas that have observed a particular tag in a single scan, the antennas can be scanned/read individually and in a sequential fashion.

The set of actual observed tags is used by the genetic algorithm to calculate fitness 202 of candidate solutions for position and orientation in an iteration process. The iteration process begins with the initialization of a population 204 of candidate solutions consisting of N members. Each member is defined by an x, y, and θ triplet that is randomly selected at 206 between minimum and maximum values consistent with the operational area frame of reference and tag positions. Since the mutation operator 214 requires a binary representation of these values, the random values are determined by selecting a random number between zero and $2^b$ (where b equals the number of bits required for a desired resolution) and multiplying by the resolution given by $(max-min)/2^b$. When robot 10 is operating in a well-structured operational area and moves are expected to be rectilinear, a set of standard candidate solutions 208 with common positions and orientations can be included in the initial population. A number of members of this standard solution set are likely to produce some tag matches and return non-zero fitness values and are intended to "jump start" the evolution process. The standard solutions could, for example, consist of equally spaced positions along the operational area centerline. Assumed orientations can correspond to, for example, the two opposing directions along the operational area centerline. However, if robot 10 is operated as if it is on a track, orientations can be limited to a single direction.

Subsequent to the first run of the genetic algorithm when the vehicle state is initialized, the most recent vehicle state estimate 210 is reintroduced into the initial solution population 204. As with the standard set of vehicle states, the previous state estimate 210 is intended to serve as a good starting solution with non-zero fitness that is then refined by the evolutionary process. Although several members of an initial population can be initialized to the previous estimate, in practice it is sufficient (and desirable) to include it only once, as these solutions tend to dominate the population within a few generations and can result in convergence to a suboptimal solution. The vehicle state estimate from a Kalman filter could be used in lieu of the raw state estimate to provide a more reliable initial state. After the population is initialized, solutions are evolved by recursive fitness-proportionate selection 212 and mutation 214 for a specified number of iterations with a new population 216 formed at each iteration. A new vehicle state estimate 210 is generated after the maximum number of iterations is reached.

The fitness of a candidate vehicle state is a measure of how closely the hypothetical set of tags that are observable at the candidate position and orientation matches the actual set of observed tags and serves as a selective pressure in the evolutionary process. The hypothetical set of tags observed for a candidate vehicle state is based on the assumption that an RFID antenna has a discrete area of sensitivity, i.e., range-bounded field-of-view as described above. All tags within the boundaries of this discrete area are assumed to be observed while those outside the discrete area are not. The above-described "pie shaped wedge" is one idealized shape for the antenna's range-bounded field-of-view that can be used to simplify the fitness calculation. However, it is to be understood that an antenna's discrete area of sensitivity can be described by any two-dimensional or three-dimensional shape without departing from the scope of the present invention. Differences between the idealized and actual discrete areas include the area shape, uniform versus variable field intensity, reflections and multipath effects, and related environmental effects (i.e., metal objects in or near the discrete area). These differences can result in errors in the actual observed tags, and hypothetical missed and omitted tags that reduce fitness.

In the absence of bearing and range information, a minimum of two antennae, each having observed at least one tag, are required to unambiguously estimate vehicle state in the present invention. In practice, four (or more) antennae can be used to account for potential limits in antenna range although a single observed tag in any two antennae remains the minimum condition theoretically required to disambiguate vehicle state. As with the tags themselves, the position and orientation of antennae with respect to the local vehicle frame of reference must match the modeled position and orientation used in the fitness calculation for accurate localization.

Fitness is defined as the number of tags observed for a candidate vehicle state for all antennae that match the actual observed tags, less a scaled number of incorrectly observed tags and a scaled number of missed tags. The scaling values are chosen to reflect the amount of selective pressure subjectively attributed to each measure. For example, the values of the coefficients for the incorrect and missed tags can both be set to 0.5. A fitness value of zero can be substituted for candidate solutions with fitness values less than zero since fitness proportionate selection requires the fitness of all members be non-negative.

The fitness values are used in an elitist fitness proportionate selection approach 212 in order to evolve the population. An elitist mechanism selects the $\mu \cdot N$ members 212A of the population with the highest fitness to establish a pool of parents for the next generation of solutions while accelerating convergence. Precedence within the population list is used in cases in which multiple solutions have identical fitness, including when all solutions have zero fitness.

The population is evolved by selecting N/2 sets of parents. Selection of parents from the elitist pool is conceptually similar to a roulette wheel, where the probability that a member is selected as a parent is proportional to the fraction of the member's fitness relative to the sum of the fitness of all members. Each pair of parents has a probability $P_c$ of performing a crossover 212B, or swapping of elements in the x, y, θ triplets. A value of $P_c$ can be selected to create a balance between information transfer and schema preservation. The genotypes consist of three values such that single or double point crossover can be used.

The mutation operator 214 is applied bitwise thereby requiring a binary representation of the genotype. The probability of mutation, $P_m$, can be set low (e.g., on the order of 0.01) to enable exploration of the state space, but preserve schema.

The advantages of the present invention are numerous. The RFID localization system presented herein is low cost and has minimal information requirements in that the system need only determine whether an RFID tag is visible or not. Such "binary" sensing provides for the use of sensors that are considerably simpler relative to other localization schemes/systems. The simplicity of the sensor requirements is supported by the present invention's use of an evolutionary optimization scheme to determine a mobile vehicle's position and orientation.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A radio frequency identification (RFID) localization system, comprising:
   a plurality of RFID tags positioned at known locations in a local frame of reference, each of said RFID tags having a unique identification associated therewith, each of said RFID tags generating an RF signal indicative of said unique identification associated therewith;
   at least two RF antennas adapted to be mounted on a mobile vehicle, each of said RF antennas at a unique known position and orientation relative to a reference point on the mobile vehicle, each of said RF antennas having a range-bounded field-of-view associated therewith, each of said RF antennas detecting each said RF signal generated by any of said RFID tags within said range-bounded field-of-view associated therewith; and
   a processor coupled to said RF antennas, said processor storing information to include (i) each of said known locations of said RFID tags along with said unique identification associated therewith, (ii) each said known position and orientation of said RF antennas, and (iii) each said range-bounded field-of-view associated with each of said RF antennas, said processor implementing an evolutionary optimization scheme using said information based on each said RF signal so-detected to determine a position and orientation of the mobile vehicle in the local frame of reference.

2. A system as in claim 1, wherein said evolutionary optimization scheme comprises a genetic algorithm.

3. A system as in claim 1, wherein said processor includes an RFID reader coupled to said RF antennas.

4. A system as in claim 3, wherein said RFID reader is electrically coupled to one of said RF antennas at a time.

5. A system as in claim 1, wherein said processor is located in proximity to said RF antennas.

6. A system as in claim 1, wherein said processor is located remotely with respect to said RF antennas.

7. A radio frequency identification (RFID) localization system, comprising:
- a plurality of RFID tags positioned at known locations in a local frame of reference, each of said RFID tags having a unique identification associated therewith, each of said RFID tags generating an RF signal indicative of said unique identification associated therewith;
- at least two RF antennas adapted to be mounted on a mobile vehicle, each of said RF antennas at a unique known position and orientation relative to a reference point on the mobile vehicle, each of said RF antennas having a range-bounded field-of-view associated therewith, each of said RF antennas detecting each said RF signal generated by any of said RFID tags within said range-bounded field-of-view associated therewith;
- an RFID reader adapted to be mounted on the mobile vehicle and coupled to said RF antennas, said RFID reader continually performing scans of said RF antennas on an individual basis wherein each said RF signal so-detected for each of said RF antennas is identified for each of said scans; and
- a processor adapted to be mounted on the mobile vehicle and coupled to said RFID reader, said processor storing information to include (i) each of said known locations of said RFID tags along with said unique identification associated therewith, (ii) each said known position and orientation of said RF antennas, and (iii) each said range-bounded field-of-view associated with each of said RF antennas, said processor implementing an evolutionary optimization scheme using said information and each said RF signal so-identified for each of said scans to determine a position and orientation of the mobile vehicle in the local frame of reference.

8. A system as in claim 7, wherein said evolutionary optimization scheme comprises a genetic algorithm.

9. A system as in claim 7, wherein each of said scans sequences through said RF antennas in an identical fashion.

10. A system as in claim 7, wherein said processor is located in proximity to said RF antennas.

11. A system as in claim 7, wherein said processor is located remotely with respect to said RF antennas.

* * * * *